Aug. 11, 1931.     W. R. PETERSON     1,818,092
APPARATUS FOR FILLING AND WEIGHING BAGS
Filed Aug. 8, 1927     6 Sheets-Sheet 3

Inventor
WILLIAM R. PETERSON.
By
Owen & Owen
Attorneys

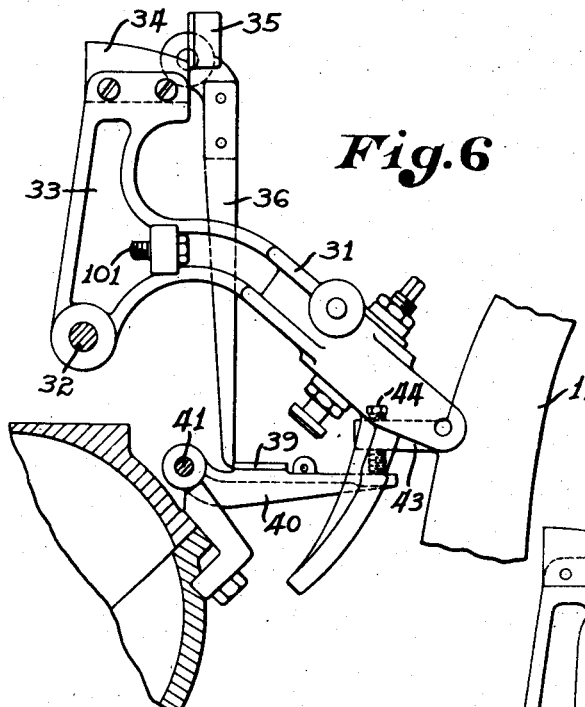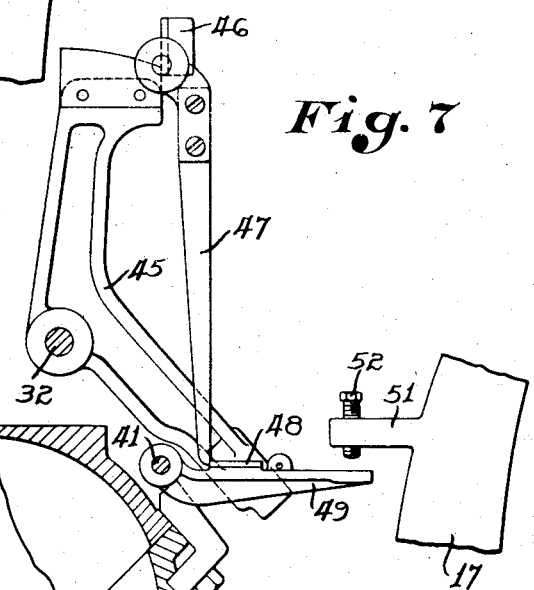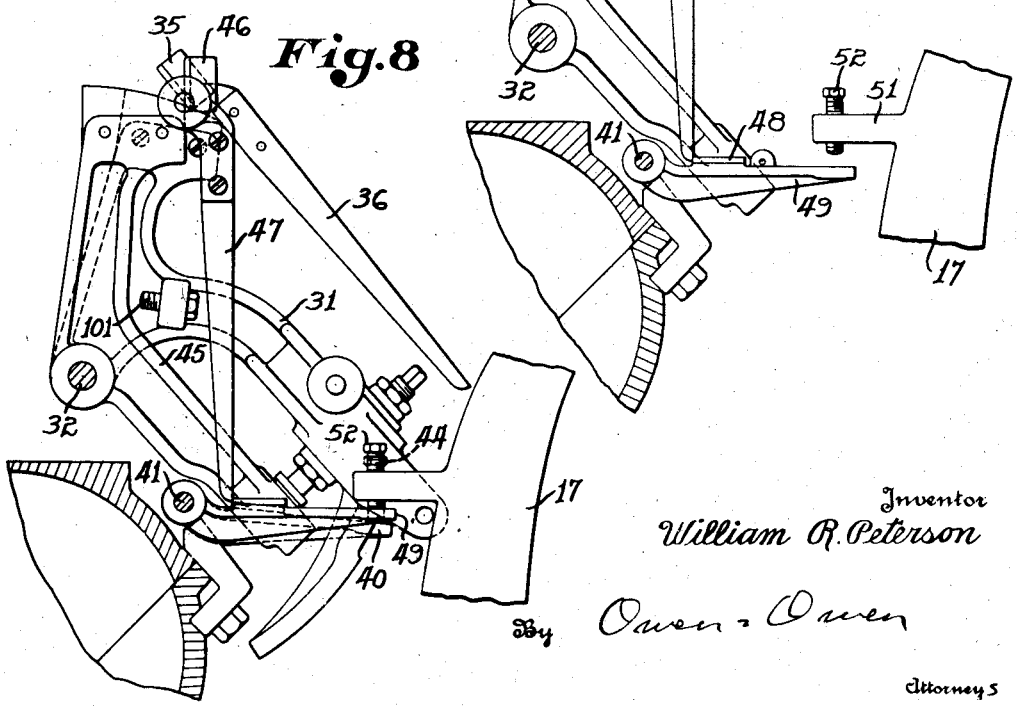

Patented Aug. 11, 1931

1,818,092

UNITED STATES PATENT OFFICE

WILLIAM R. PETERSON, OF CHICAGO, ILLINOIS, ASSIGNOR, BY MESNE ASSIGNMENTS, TO ST. REGIS PAPER COMPANY, OF NEW YORK, N. Y., A CORPORATION OF NEW YORK

APPARATUS FOR FILLING AND WEIGHING BAGS

Application filed August 8, 1927. Serial No. 211,371.

This invention relates to apparatus for filling and weighing bags, and more particularly to filling and weighing valve bags.

The object of the invention is to fill a bag until the charge is of exactly the desired weight, and then to stop the filling and automatically discharge the bag from the apparatus.

In the preferred embodiment of the invention there is means for filling the major portion of the charge into the bag at a comparatively rapid speed and completing the filling at a comparatively slow speed, so that greater accuracy can be achieved in the weighing than would result if the filling was entirely at the rapid speed. For example, if ninety-four pounds of cement is filled into a bag in six seconds, the filling rate is nearly sixteen pounds to the second, and a variation of one sixty-fourth of a second in stopping the feed results in approximately a quarter of a pound variation in the weight. If eighty-five pounds is filled into the bag in five and one-half seconds, and the remaining nine pounds is filled into the bag at the rate of four pounds a second, a variation in the final stopping of the feed will have only one-fourth the effect in varying the weight of the filled bag, while the total time of filling is only slightly increased. For this reason the two-stage filling is preferable where great accuracy is desired.

However, the invention includes a tripping device for stopping the feed which is so delicately adjusted that considerable accuracy may be attained with only the one-speed feeding.

The details of the apparatus and of the way in which the objects of this invention are achieved will appear as the description proceeds.

Figure 1:
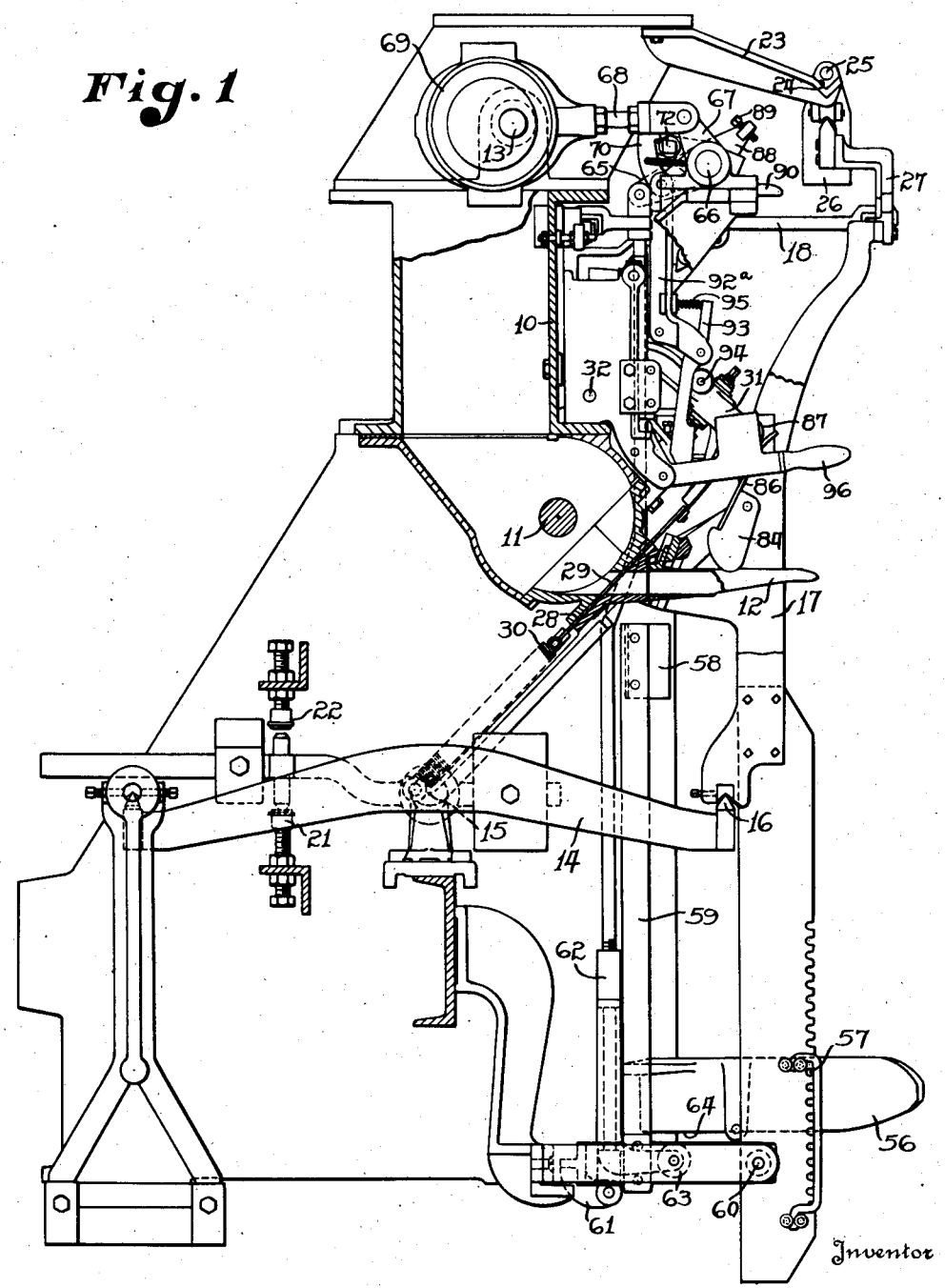
Figure 2:
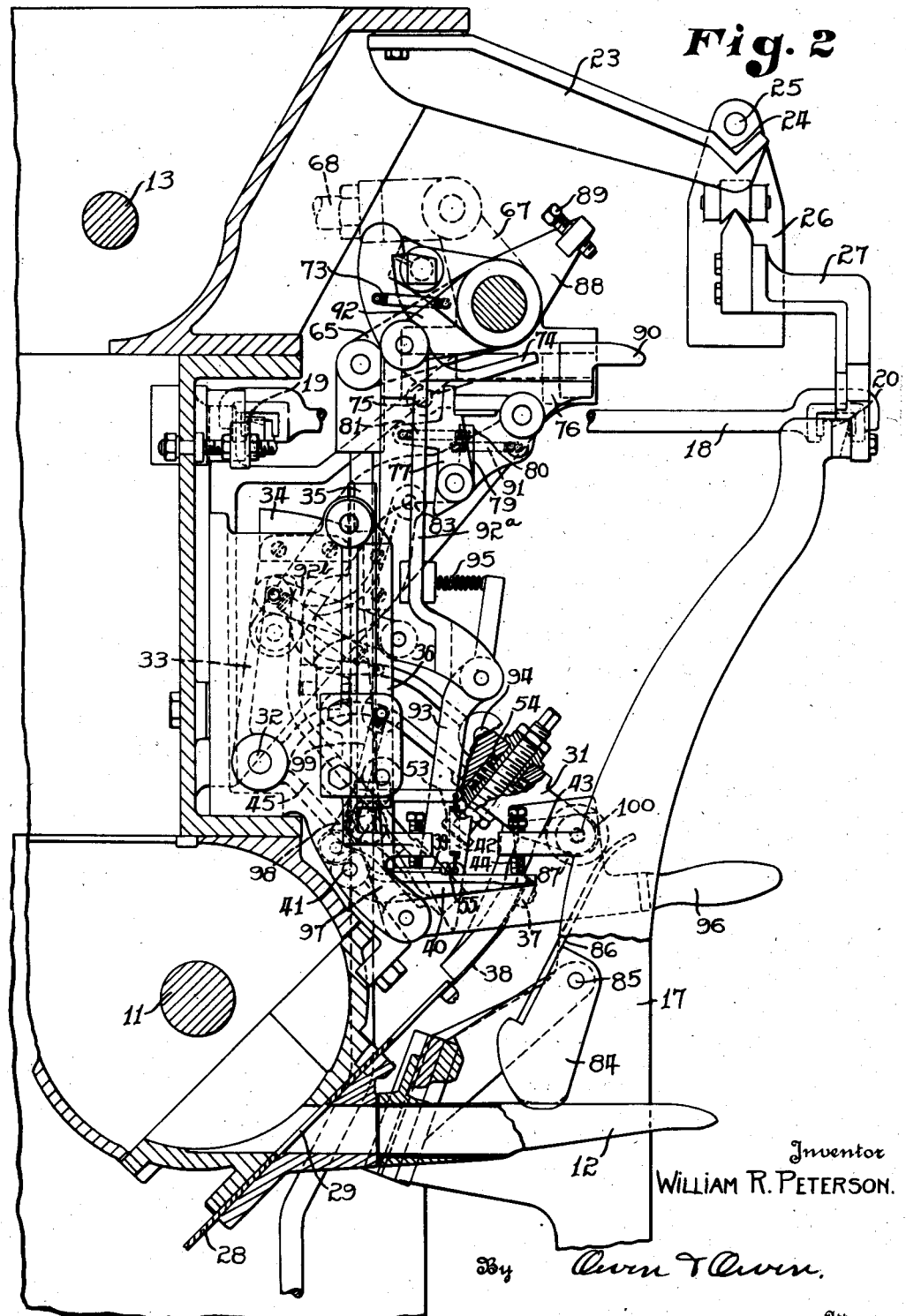
Figure 3:
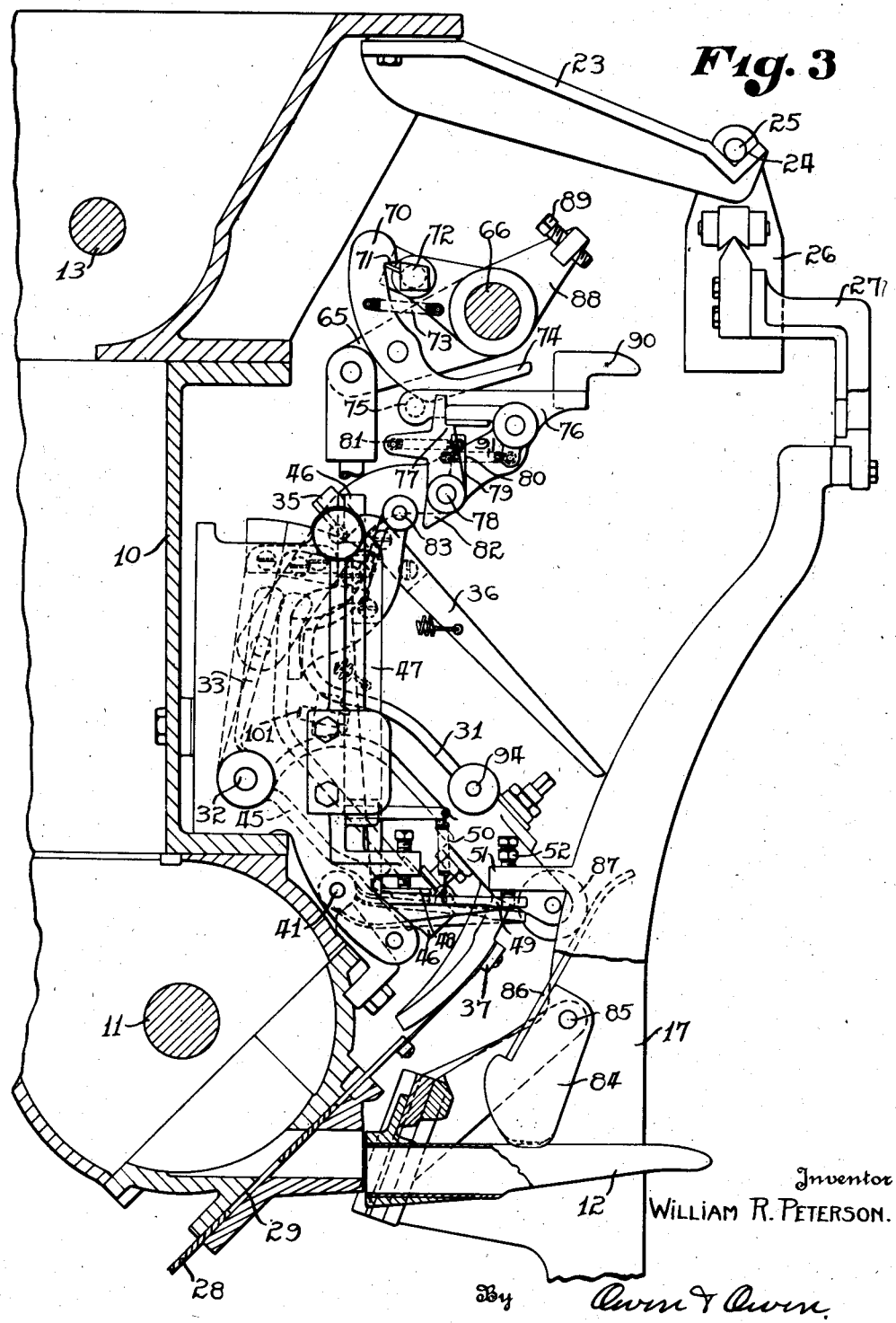
Figure 4:
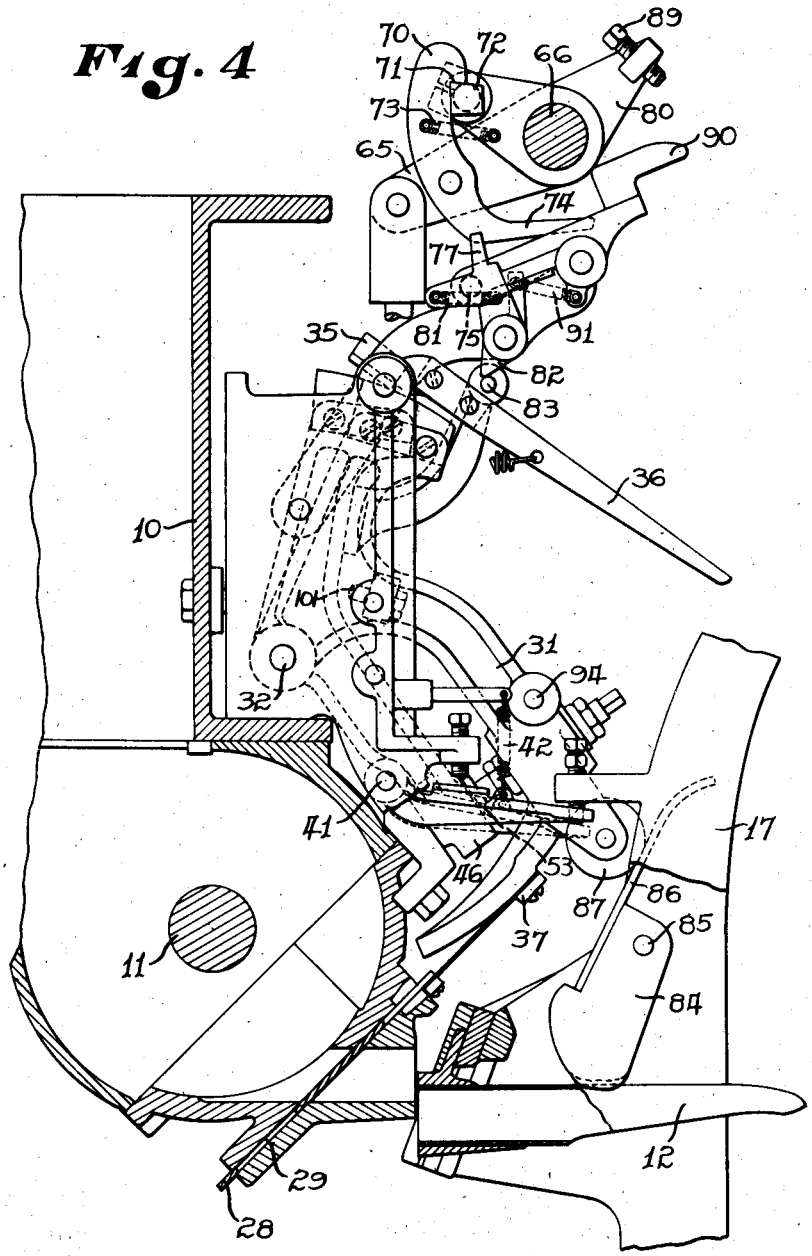
Figure 5:
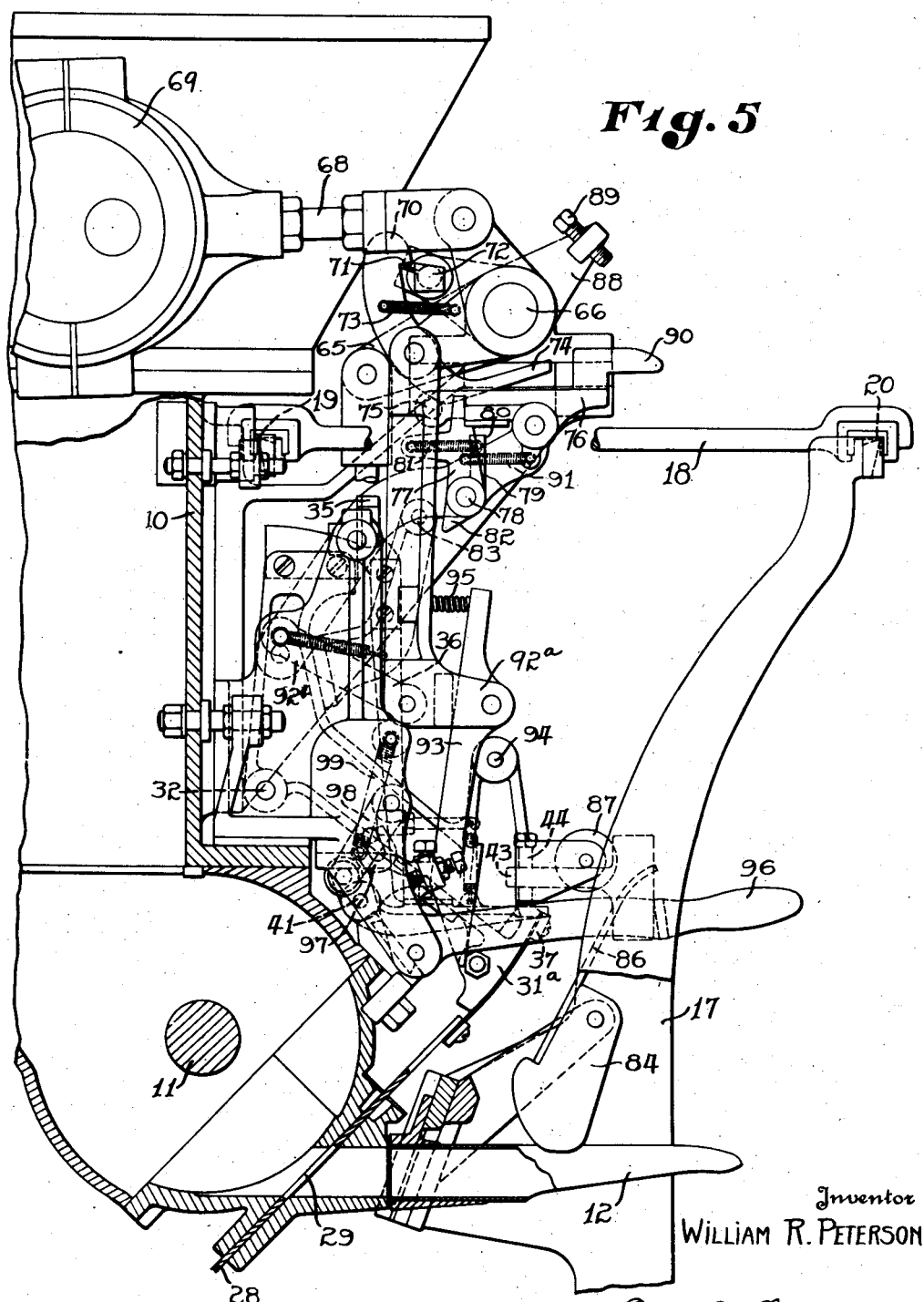

In the accompanying drawings forming a part of this specification, Figure 1 is a view, partly in elevation and partly in vertical section, of one form of apparatus embodying the invention; Fig. 2 is an enlarged view of the upper portion of the apparatus, in filling position; Figs. 3 and 4 are views similar to Fig. 2, but showing the parts in their positions at the completion of the rapid filling of the final filling, respectively; and Fig. 5 is a view similar to Fig. 2, but showing a modified form of apparatus; Fig. 6 is a detail view showing gate-holding lever 31 about to be tripped; Fig. 7 is a detail showing gate-holding lever 45 and the associated trip in the position they occupy when the parts shown in Fig. 6 are in the positions there shown; and Fig. 8 is a combined view of the parts shown in Figs. 6 and 7 in the positions they occupy when lever 45 is about to be tripped.

In the apparatus disclosed, there is a container 10 for the material to be fed into the bag. A suitable discharging propeller is mounted upon a shaft 11 and drives the material through a spout 12 which is adapted to enter the valve of a valve bag, in a manner well known in the art. Above container 10 there is a feeding device mounted upon a shaft 13 and adapted to control the passage of material into container 10. Shafts 11 and 13 are driven continuously in any desired manner.

Beneath the container there are scale beams 14 mounted upon a fulcrum 15 and having knife-edge pivots 16 for supporting an A-shaped frame 17. The upper end of the A frame is guided in its vertical movement by a link 18 having one end pivoted at 19 to a fixed part of the apparatus and the other end pivoted at 20 to the top of the A frame. Attention is called to the fact that the upper part of the A frame is bent to the right, as shown in the drawings, and the parts are so constructed that the top of the A frame constantly tends to move to the right. The pivotal construction at 19 and 20, as best shown in Fig. 5, is such that this outward tendency of the upper part of the A frame holds the knife-edge pivots tight, and avoids any play which might vary the position of the frame. As will appear from the following description, the stopping of the feed depends upon the position of the A frame, so that the accurate control of the position of the A frame, and the absence of any play in any pivotal joints which might cause variation in the position of the A frame, is essential to the accuracy of the results.

Counterweights are mounted on the scale beam in any desirable manner to counterbalance the entire weight of the frame and of the filled bag. The vertical movement of the A frame is limited by stops 21 and 22 for the scale beam. When there is no filled package mounted in the A frame, the rear end of the scale beam normally rests upon stop 22, whereas stop 21 limits the downward movement of the A frame when the filling of the package is completed.

From a fixed part of the apparatus there extends a bracket 23 above the A frame. In the end of bracket 23 there is a notch 24 in which there may rest a lug 25 on an auxiliary weight 26. The auxiliary weight is mounted upon a supporting member 27 which rests upon the top of the A frame. In the normal position of the A frame the auxiliary weight is raised so that the lug 25 is slightly above notch 24.

Discharge of material from the container through stop 12 is governed by a gate 28, which preferably consists of a sheet of metal having therein an opening 29 which registers with the discharge opening of the container and the entrance end of spout 12 when the gate is in open position. A spring 30 normally tends to pull the gate downward towards closed position.

A gate-raising lever 31 is pivoted to the frame at 32 and has an upwardly extending member 33 having thereon a contact member 34 which rests, during the filling operation, against a lug 35 on tripping latch 36. The upper end of the gate is attached to lever 31 at 37, and there is an arcuate guiding member 38 against which the flexible end of the gate rests as it is raised. The surface of member 38 is curved about fulcrum 32, so that the surface of the member remains at all times equally distant from that fulcrum, and as the gate is raised its upper end is bent about this surface so that the portion of the gate in the slideway is drawn endwise without any tendency to pull it against one or the other side of the slideway through which it moves.

The lower end of tripping latch 36 rests against a plate 39 on a retaining latch 40 pivoted to the main frame at 41 and normally drawn upward by a spring 42 so as to hold plate 39 in contact with the end of the tripping latch. A lug 43 on the A frame is provided with a set screw 44, which is adapted to contact the end of the retaining latch, when the weight in the bag is sufficient to lower the A frame, and lower the retaining latch sufficiently to release tripping latch 36 and release the gate lever.

In the preferred form of the construction, the parts are so arranged that the retaining latch is tripped by the lowering of the A frame sufficiently to bring the auxiliary weight lug 25 into contact with notch 24.

An auxiliary gate-lever 45 is pivoted on the same fulcrum with the main gate-lever. The upper end of auxiliary gate-lever 45 normally rests against a lug 46 upon a tripping latch 47, similar to tripping latch 36. Tripping latch 47 is governed in a way similar to that in which latch 36 is governed, that is, the lower end of latch 47 normally contacts a plate 48 on a retaining latch 49 pivoted to the frame at 41 and normally raised by a spring 50. A lug 51 on the A frame carries a set screw 52 adjusted to release retaining latch 49 from tripping latch 47 when sufficient material is fed into a bag to lower the A frame below the point where the auxiliary weight is supported by bracket 23.

When sufficient material is fed into the bag so that the A frame is lowered until the auxiliary weight contacts bracket 23, the main gate-lever is tripped and is swung about its fulcrum until a plunger 53 cushioned by a spring 54 contacts an abutment plate 55 on the auxiliary gate lever. At this point the gate is partially closed, but material continues to pass out through the remaining opening into the bag until the weight is sufficient to lower the bag and release tripping latch 47, whereupon the auxiliary gate lever is released and the closing of the gate is completed.

Mounted in the A frame beneath the discharge spout is a bottom support 56 pivoted at 57 to the A frame. This bottom support normally rests in a substantially horizontal position.

On the side of the bag towards container 10, and a little below the filling spout, there is a cross-piece 58 mounted upon legs 59 pivoted at 60, and forming a discharging frame. Actuating arms 61 extend from the discharging frame and are connected to a vertically reciprocable link 62. Link 62 also carries a roller 63 adapted to engage an abutment 64 on bottom support 56.

The upper end of link 62 is pivoted to a lifting lever 65 fulcrumed on a shaft 66. Extending from the shaft 66 there is an arm 67 connected by a link 68 to an eccentric 69 on shaft 13. As the shaft 13 is rotated constantly, rock shaft 66 is continuously rocked by the described connection.

A discharging pawl 70 is pivoted to lever 65 and has a tooth 71 adapted to engage a lifting lug 72 on an arm of rock shaft 66. A spring 73 normally urges pawl 70 into engagement with lug 72. However, the pawl is provided with a substantially horizontal extension 74 which is normally raised by a lug 75 on a locking member 76. Locking member 76 in turn is held in its upward position by a catch 77 pivoted at 78. A catch trip 79 has an upwardly extending end 80 normally drawn against catch 77 by a spring 81. Trip 79 has a downwardly extending finger 82 normally extending into the path of a member 83 on the gate lever. It will be seen that, when the gate lever is tripped so that the gate closes, member 83 contacts finger 82 and moves trip 79 so as to force catch 77 from beneath locking member 76 and thereby allow spring 73 to draw the pawl into position with its tooth 71 over lug 72, upon the next reciprocation of the arm carrying that lug. Upon the upward movement of the lug, lever 65 is lifted by the pawl and in turn raises link 62, which raises roller 63 against abutment 64 and tilts the bottom support, and at the same time the lifting link tilts the discharging frame so as to move the bag-contacting portion 78 to the right, as viewed in the drawings, and thereby force the bag from the filling tube.

A bag gripping member 84 is pivoted at 85 above the spout, and its under surface normally contacts a bag on the spout and prevents the bag from slipping off of the spout. Gripping member 84 has an upper extension 86 in the path of a roller 87 on the gate lever, and when the gate is closed roller 87 contacts extension 86, forcing it to the right, as viewed in the drawings, and releasing the gripping member from the bag.

An arm 88 rigid on rock shaft 66 has therein a set screw 89 adapted to contact a heel 90 of locking member 76, so that when rock shaft 66 is rocked in a direction to raise lug 72, set screw 89 tilts member 76 so as to allow spring 91 to draw catch 77 to the right into position to support locking member 76.

Pivoted to an arm 92 on rock shaft 66 there is a depending link 92$^a$ guided by a link 92$^b$ pivoted to the frame. From link 92$^a$ there depends a hook 93 adapted to engage a lug 94 on the gate lever, under suitable circumstances. Hook 93 is normally maintained out of engagement with lug 94 by spring 95.

A starting handle 96 is pivoted to a stationary portion of the frame, and has a yoke 97 extending upward from the pivot in position to engage a member 98 pivoted at its upper end to a stationary part of the frame. A spring 99 attached to the frame above the pivot of member 98 tends to maintain member 98 swung to one side of its pivot, preventing its return to the other side until the resistance of the spring is overcome. Spring 99 is strong enough to maintain starting handle 96 in its raised position until the handle is intentionally lowered. When the outer end of the handle is forcibly lowered, it throws member 98 to the right, and immediately after spring 99 passes the pivot upon which member 98 is mounted, the spring urges the lower end of member 98 further to the right. When so urged, member 98 contacts lifting hook 93 with sufficient force to move it to the right, overcoming spring 95, so that when the hook is next lowered it engages lug 94, and upon its next upward motion, it raises the gate lever.

When the gate lever is raised, it opens the gate and allows the material to be discharged into a bag in position on the filling spout. At the same time, roller 87 is raised out of contact with extension 86 of the bag gripping member, allowing the member to grip the bag and prevent its sliding off the filling spout. The upper extension of the gate lifting lever moves to the left, member 83 swinging finger 97 during this movement, but the yielding of spring 81 allows this movement of the finger without affecting the position of trip 79. This same movement of the upper end of the gate lever to the left moves it into position past tripping latch 36, so that the latch swings downward into position and is held in place by latch 47 until the A frame is again lowered.

When the gate lever is lifted, a member 100 thereon lifts handle 96, thereby swinging the yoke connected with the handle to the left and moving member 98 to the left so that spring 99 passes beyond the pivot of member 98 and returns the member to its original position, in which it holds the starting handle elevated, and allows hook 96 to be forced by spring 95 out of engagement with lug 94 on the gate lever.

When the main gate lever is raised, a set screw 101 thereon contacts the auxiliary gate lever and returns it to filling position.

The operation of the apparatus has been indicated in connection with the description of the construction, but for convenience it may be briefly summarized.

The upper portion of the apparatus is approximately in the position shown in Fig. 4 when the filling of a bag is to be started. The operator places a bag upon the filling tube and then lowers the starting handle. Thereupon the lifting hook engages the gate lever, upon the next upward oscillation of arm 92, and lifts the gate. Lifting the gate lever raises the gate until the opening therein registers with the filling tube, so that material is discharged into the bag. At the same time the bag gripping member 84 is released and allowed to swing into gripping position. The starting handle is likewise raised so that the lifting hook is released and remains in its inoperative position until the starting handle is lowered for filling the next bag. Set screw 101 on the main gate lever contacts the auxiliary gate lever, and both gates are locked in their raised positions by the respective latches.

The A frame supports the bag and also auxiliary weight 26. Material is discharged very rapidly through the fully opened filling tube into the bag until the weight of the bag, together with the auxiliary weight, is sufficient to overcome the counterweights on the scale beam, whereupon the A frame drops until the auxiliary weight rests on bracket 23. This drop is sufficient to trip the main gate lever, so that this lever drops and the gate drops until the main gate lever is stopped by the auxiliary lever. In this position of the parts, shown in Fig. 3, the remaining opening into the discharge spout is comparatively small, so that the discharge of material is retarded. This retarded flow of material continues until an additional amount equaling the auxiliary weight has entered the bag, whereupon the A frame will once more descend, tripping the auxiliary gate lever and thus completing the shutting off of the material. During this final movement of the gate levers, catch 77 is forced from beneath locking member 76, and pawl 70 becomes operative upon the next oscillation of the rock shaft. The result is to lift link 62, tilt the bottom support and the discharging frame, and thus discharge the filled bag. Upon the return movement of the rock shaft, link 62 is lowered, the bottom support and the discharge frame are returned to their normal position, and the pawl is once more locked in inoperative position. The apparatus is then ready to receive another bag, whereupon the starting handle may be lowered and the operation repeated.

Except where exceedingly accurate weights are required, the auxiliary weight and auxiliary gate-lever may be omitted, as a construction such as illustrated in Fig. 5 operates to give fairly accurate weights. It will be readily seen that this construction is substantially the same as that shown in Figs. 1 to 4, except for the omission of the auxiliary weight and auxiliary gate-lever, and, therefore, the construction and operation need not be described in detail. A somewhat modified form of gate lever 31ᵃ is employed, but its operation is the same as that of the main gate lever in the preferred form.

The construction wherein the movement of the A frame is controlled by knife-edge pivotal connections constantly held in tight engagement, so that the position of the A frame is at all times accurately controlled, and whereby the downward movement of the A frame directly contacts a horizontally extending member of the retaining latch for the trip, results in exceedingly accurate control of the time of tripping. Furthermore, the long leverage, between the engagement of the gate lever and the engagement of the retaining latch with the tripping latch, reduces the friction on the tripping latch to a minimum, so that the tripping of the retaining latch interferes very little with the movement of the A frame, and variations in this friction and consequent effect upon the movement of the A frame is practically negligible.

Furthermore, the described connection of the gate lever with the gate, whereby the strain on the gate is always directly longitudinal of the gate, and cramping of the gate in its slideway is avoided, reduces danger of varying friction on the gate, and consequent varying speeds in the closing movement of the gate.

The combined result of the above features is very accurately weighing, even when the auxiliary weight and auxiliary lever are dispensed with, and when these are used, an accuracy is achieved which satisfies the most exacting requirements.

The invention disclosed in this application is an improvement on that disclosed in my prior application for automatic cement packing machine, filed July 20, 1927, Serial No. 207,152.

Various changes may be made in the mechanical construction of the several parts while retaining some of the advantages referred to above. Alternative constructions, not described but within the scope of the appended claims, come within the scope of the invention.

What I claim is:

1. In filling and weighing apparatus, a scale beam, a container-support pivotally mounted on the beam, a feeding device for filling material into a container on said support, a link above and parallel with the beam for maintaining the support in correct vertical position, said position being such as to constantly exert an endwise pull on the link, and knife-edge pivotal connections at each end of the link arranged to be held in tight engagement by said endwise pull.

2. In filling and weighing apparatus, a scale beam, a support for a valve bag pivotally mounted on the scale beam, a feeding device adapted to feed material laterally into the bag through its valve while on the support, the support being mounted so that it tends constantly to move away from the feeding device, a link holding the support in proper relation with the feeding device, and knife-edge pivotal connections at each end of the link arranged to be held in tight engagement by the endwise pull of the support on the link.

3. In filling and weighing apparatus, a scale beam, a material container above the beam, a support for a valve bag pivotally mounted upon the beam, means to feed material from the container laterally into a bag on the support, a link above and parallel with the scale beam and controlling the upper end of the support, said link equaling in length the distance between the pivotal connection of the support to the scale beam and the fulcrum of the beam and the upper end of the support being slanted so that the stationary end of said link can be pivoted on the side of the container towards said support.

4. In filling and weighing apparatus, weighing means, a valve bag-support mounted on the weighing means, a filling device adapted to fill material horizontally through the valve of the bag on the support, a pivoted trip having a horizontally extending arm, a member on the support adapted to contact the arm near its end and force it downward with the movement of the support, a catch on the trip at a less distance from the pivot than the length of the arm, and means for stopping the filling device controlled by the catch.

5. In filling and weighing apparatus, weighing means, a container-support mounted on the weighing means, a filling device adapted to fill the container on the support, a pivoted trip having a horizontally extending arm, a vertically adjustable support adapted to contact the arm near its end and force it downward with the movement of the support, a pivoted member having a substantially vertical arm normally engaging said trip, and means for stopping the filling device controlled by said pivoted member.

6. In filling and weighing apparatus, a scale beam, a valve bag support pivotally mounted on the beam, a filling device adapted to fill a bag on the support, a link controlling the horizontal position of the upper end of the support, the parts being so arranged that tension is constantly exerted on the link, knife-edge pivots for each end of the link arranged to be held tight by said tension, a trip adapted to be actuated by the vertical movement of the support, and means for stopping the filling device actuated by said trip.

7. In filling and weighing apparatus, a feeding device adapted to discharge material into a container, a gate controlling the opening from the filling device into the container, means constantly tending to close the gate, a lever for maintaining the gate open during filling operation, a pivoted latch, means on the lever engaging the latch near its pivot, a trip member engaging the latch at a comparatively great distance from its pivot, means for weighing the container being filled, and connections from said weighing means adapted to actuate said trip.

8. In filling and weighing apparatus, a vertically movable support for a container, means for feeding material into a container on the support, means governing the vertical position of the support in accordance with the weight of the material in the container thereon, a gate adapted to control the passage of material from the feeding device into the container, means constantly urging the gate to closed position, a lever adapted to hold the gate in open position during filling operation, a pivoted latch, means on the lever engaging the latch near its pivot, said latch having an elongated portion extending substantially vertically, a pivoted trip member engaging the vertically extending portion of said latch at a comparatively great distance from its pivot, the trip having a horizontally extending member, and means on the container adapted to contact the horizontally extending member of the trip and release the latch when the support moves down by reason of the weight of material in the container.

9. In filling and weighing apparatus, weighing means, a container-support mounted on the weighing means, a filling spout adapted to discharge into a container on the support, a gate adapted to close said spout, a pivoted member connected to the gate, a catch having a normally vertical arm, there being an arm on said pivoted member adapted to engage the catch near the pivot of the catch when the gate is open, a pivoted trip member having a substantially horizontal arm and adapted to engage the end of the arm of said catch, and means on the support in position to engage the trip and release the catch when the support is lowered.

10. In filling and weighing apparatus, weighing means, a support mounted on the weighing means and adapted to support a container, the weighing means being adjusted to maintain the support in an upward position until a predetermined weight of material is fed into the container and then to allow the downward movement of the support, a feeding device for feeding material into a container upon the support, a weight mounted on the support, a bracket for intercepting the weight during the downward travel of the support, a trip device for slowing up the operation of the feeding device, means to actuate said tripping device during the travel of the support before the weight is intercepted, a second trip device adapted to completely shut off the feed of material, and means for actuating said second tripping device during the downward travel of the support after the interception of the weight.

11. In filling and weighing apparatus, a scale beam, a support for a valve bag pivotally mounted on the scale beam, a link for maintaining the upper end of the support in proper position, a feeding device for filling material into a bag on the support, a gate controlling the passage of material from the feeding device into the bag, means constantly tending to close the gate, a lever adapted to hold the gate in open position, a lever adapted to hold the gate in partially open position, a weight on the scale beam adapted to counterbalance the support and filled bag thereon, an auxiliary weight upon the support, a bracket in position to intercept the auxiliary weight during the downward travel of the support, a trip for the first said lever released by the movement of the support before the auxiliary weight is intercepted, and a trip for the second said lever released during the downward travel of the support after the auxiliary weight is intercepted.

12. In filling and weighing apparatus, a vertically movable support for a container, means for controlling the vertical position of the support by the weight of material in the container thereon, a feeding device adapted to fill material into a container on the support, a gate controlling the passage of material from the device into the container, a spring attached to one end of the gate and constantly drawing the gate towards closed position, a lever adapted to hold the gate in open position, a flexible connection between the gate and the lever, and a member having an arcuate surface described about the fulcrum of the lever and adapted to maintain the effective connection between the lever and the gate constantly in the line of movement of the gate.

13. In filling and weighing apparatus, a scale beam, a support for a valve bag pivotally mounted on the scale beam, a filling device adapted to fill material into a bag on the support, an auxiliary weight upon the support, means to intercept the weight during its downward travel, means to partially stop the action of the feeding device when the weight is intercepted, means for completely stopping the action of the feeding device during downward travel of the support after the weight is intercepted, and mechanical means for discharging a bag from the support when the operation of the feeding device is completely stopped.

14. In filling and weighing apparatus, a scale beam, a support for a valve bag pivotally mounted on the beam, connections for maintaining the vertical position of the support so arranged that the position of the support is constantly maintained in relation to knife-edge pivots, a feeding device for a bag upon the support, means controlled by the movement of the support for stopping the feeding device, and mechanical means for discharging a filled bag from the support when the feeding is stopped.

In testimony whereof, I have hereunto signed my name to this specification.

WILLIAM R. PETERSON.